United States Patent
Morris et al.

(10) Patent No.: US 9,458,876 B2
(45) Date of Patent: *Oct. 4, 2016

(54) ELASTICALLY DEFORMABLE ALIGNMENT FASTENER AND SYSTEM

(71) Applicant: GM GLOBAL TECHNOLOGY OPERATIONS LLC, Detroit, MI (US)

(72) Inventors: Steven E. Morris, Fair Haven, MI (US); Marc J. Tahnoose, West Bloomfield, MI (US); Michael E. McGuire, Milford, MI (US); Jennifer P. Lawall, Waterford, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 14/012,205

(22) Filed: Aug. 28, 2013

(65) Prior Publication Data

US 2015/0063943 A1    Mar. 5, 2015

(51) Int. Cl.
*F16B 21/08* (2006.01)
*F16B 39/284* (2006.01)
(Continued)

(52) U.S. Cl.
CPC .......... *F16B 39/284* (2013.01); *F16B 19/004* (2013.01); *B60R 13/0206* (2013.01); *F16B 21/086* (2013.01)

(58) Field of Classification Search
CPC ... F16B 21/086; F16B 19/04; B60R 13/0206
USPC ................... 411/508–510; 24/297
See application file for complete search history.

(56) References Cited

U.S. PATENT DOCUMENTS 1,219,398 A    3/1917  Huntsman
1,261,036 A    4/1918  Kerns
(Continued)

FOREIGN PATENT DOCUMENTS

BE    842302 A    9/1976
CN    1036250 A    10/1989
(Continued)

OTHER PUBLICATIONS

"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, V. 26, No. 3, Elsevier Publishing, Jul. 2002.

(Continued)

*Primary Examiner* — Flemming Saether
(74) *Attorney, Agent, or Firm* — Cantor Colburn LLP

(57) ABSTRACT

An elastically deformable alignment fastener has the form of a unitary object having a head portion and an integrally formed body portion. The body portion has an elastically deformable lobular hollow tube having a proximal end proximate the head portion and a distal end axially displaced from the head portion. The lobular hollow tube has an outer surface having one or more retention features oriented to provide a plurality of radially extending engagement surfaces along a length of the hollow tube. The head portion has a flange that circumscribes the proximal end of the lobular hollow tube. Portions of the elastically deformable lobular hollow tube when inserted into circular apertures of first and second components elastically deform to an elastically averaged final configuration that aligns the first and second components in four planar orthogonal directions.

17 Claims, 5 Drawing Sheets

(51) Int. Cl.
  *F16B 19/00* (2006.01)
  *B60R 13/02* (2006.01)

(56) References Cited

U.S. PATENT DOCUMENTS

| | | |
|---|---|---|
| 1,301,302 A | 4/1919 | Nolan |
| 1,556,233 A | 10/1925 | Maise |
| 1,819,126 A | 8/1931 | Scheibe |
| 1,929,848 A | 10/1933 | Neely |
| 1,968,168 A | 7/1934 | Place |
| 1,982,076 A | 11/1934 | Spahn |
| 1,999,990 A | 4/1935 | Carr |
| 2,006,525 A | 7/1935 | Thal |
| 2,267,558 A | 12/1941 | Birger, et al. |
| 2,275,103 A | 3/1942 | Gooch, et al. |
| 2,275,900 A | 3/1942 | Hall |
| 2,385,180 A | 9/1945 | Allen |
| 2,482,488 A | 9/1949 | Franc |
| 2,560,530 A | 7/1951 | Burdick |
| 2,612,139 A | 9/1952 | Collins |
| 2,688,894 A | 9/1954 | Modrey |
| 2,693,014 A | 11/1954 | Monahan |
| 2,707,607 A | 5/1955 | O'Connor |
| 2,778,399 A | 1/1957 | Mroz |
| 2,780,128 A * | 2/1957 | Rapata ............ 411/510 |
| 2,788,046 A | 4/1957 | Joseph |
| 2,862,040 A | 11/1958 | Curran |
| 2,902,902 A | 9/1959 | Slone |
| 2,940,149 A | 6/1960 | O'Connor |
| 2,946,612 A | 7/1960 | Ahlgren |
| 2,958,230 A | 11/1960 | Haroldson |
| 3,005,282 A | 10/1961 | Christiansen |
| 3,014,563 A | 12/1961 | Bratton |
| 3,087,352 A | 4/1963 | Daniel |
| 3,089,269 A | 5/1963 | McKiernan |
| 3,130,512 A | 4/1964 | Van Buren, Jr. |
| 3,152,376 A | 10/1964 | Boser |
| 3,168,961 A * | 2/1965 | Yates ............ 220/787 |
| 3,169,004 A | 2/1965 | Rapata |
| 3,169,439 A | 2/1965 | Rapata |
| 3,188,731 A | 6/1965 | Sweeney |
| 3,194,292 A | 7/1965 | Borowsky |
| 3,213,189 A | 10/1965 | Mitchell et al. |
| 3,230,592 A | 1/1966 | Hosea |
| 3,233,358 A | 2/1966 | Dehm |
| 3,233,503 A * | 2/1966 | Fernberg ............ 411/512 |
| 3,244,057 A * | 4/1966 | Mathison ............ 411/397 |
| 3,248,995 A | 5/1966 | Meyer |
| 3,291,495 A | 12/1966 | Liebig |
| 3,310,929 A | 3/1967 | Garvey |
| 3,413,752 A | 12/1968 | Perry |
| 3,473,283 A | 10/1969 | Meyer |
| 3,531,850 A | 10/1970 | Durand |
| 3,551,963 A | 1/1971 | Long |
| 3,643,968 A | 2/1972 | Horvath |
| 3,669,484 A | 6/1972 | Bernitz |
| 3,680,272 A | 8/1972 | Meyer |
| 3,733,655 A | 5/1973 | Kolibar |
| 3,800,369 A | 4/1974 | Nikolits |
| 3,841,044 A | 10/1974 | Brown |
| 3,841,682 A | 10/1974 | Church |
| 3,842,565 A | 10/1974 | Brown et al. |
| 3,845,961 A | 11/1974 | Byrd, III |
| 3,847,492 A | 11/1974 | Kennicutt et al. |
| 3,860,209 A | 1/1975 | Strecker |
| 3,868,804 A | 3/1975 | Tantlinger |
| 3,895,408 A | 7/1975 | Leingang |
| 3,897,967 A | 8/1975 | Barenyi |
| 3,905,570 A | 9/1975 | Nieuwveld |
| 3,972,550 A | 8/1976 | Boughton et al. |
| 3,988,808 A | 11/1976 | Poe et al. |
| 4,035,874 A | 7/1977 | Liljendahl |
| 4,039,215 A | 8/1977 | Minhinnick |
| 4,042,307 A | 8/1977 | Jarvis |
| 4,043,585 A | 8/1977 | Yamanaka |
| 4,158,511 A | 6/1979 | Herbenar |
| 4,169,297 A | 10/1979 | Weihrauch |
| 4,193,588 A | 3/1980 | Doneaux |
| 4,213,675 A | 7/1980 | Pilhall |
| 4,237,573 A | 12/1980 | Weihrauch |
| 4,267,680 A | 5/1981 | Delattre |
| 4,300,851 A | 11/1981 | Thelander |
| 4,313,609 A | 2/1982 | Clements |
| 4,314,417 A | 2/1982 | Cain |
| 4,318,208 A | 3/1982 | Borja |
| 4,325,574 A | 4/1982 | Umemoto et al. |
| 4,358,166 A | 11/1982 | Antoine |
| 4,363,839 A | 12/1982 | Watanabe et al. |
| 4,364,150 A | 12/1982 | Remington |
| 4,384,803 A | 5/1983 | Cachia |
| 4,394,853 A | 7/1983 | Lopez-Crevillen et al. |
| 4,406,033 A * | 9/1983 | Chisholm et al. ............ 16/4 |
| 4,407,413 A | 10/1983 | Jansson |
| 4,477,142 A | 10/1984 | Cooper |
| 4,481,160 A | 11/1984 | Bree |
| 4,527,760 A | 7/1985 | Salacuse |
| 4,564,232 A | 1/1986 | Fujimori et al. |
| 4,575,060 A | 3/1986 | Kitagawa |
| 4,591,203 A | 5/1986 | Furman |
| 4,599,768 A | 7/1986 | Doyle |
| 4,605,575 A | 8/1986 | Auld et al. |
| 4,616,951 A | 10/1986 | Maatela |
| 4,648,649 A | 3/1987 | Beal |
| 4,654,760 A | 3/1987 | Matheson et al. |
| 4,672,732 A | 6/1987 | Ramspacher |
| 4,745,656 A | 5/1988 | Revlett |
| 4,757,655 A | 7/1988 | Nentoft |
| 4,767,647 A | 8/1988 | Bree |
| 4,805,272 A | 2/1989 | Yamaguchi |
| 4,807,335 A | 2/1989 | Candea |
| 4,817,999 A | 4/1989 | Drew |
| 4,819,983 A | 4/1989 | Alexander et al. |
| 4,843,975 A | 7/1989 | Welsch |
| 4,843,976 A | 7/1989 | Pigott et al. |
| 4,865,502 A | 9/1989 | Maresch |
| 4,881,764 A | 11/1989 | Takahashi et al. |
| 4,917,426 A | 4/1990 | Copp |
| 4,973,212 A | 11/1990 | Jacobs |
| 4,977,648 A | 12/1990 | Eckerud |
| 5,005,265 A | 4/1991 | Muller |
| 5,039,267 A | 8/1991 | Wollar |
| 5,100,015 A | 3/1992 | Vanderstuyf |
| 5,111,557 A | 5/1992 | Baum |
| 5,139,285 A | 8/1992 | Lasinski |
| 5,154,479 A | 10/1992 | Sautter, Jr. |
| 5,165,749 A | 11/1992 | Sheppard |
| 5,170,985 A | 12/1992 | Killworth et al. |
| 5,180,219 A | 1/1993 | Geddie |
| 5,208,507 A | 5/1993 | Jung |
| 5,212,853 A | 5/1993 | Kaneko |
| 5,234,122 A | 8/1993 | Cherng |
| 5,250,001 A | 10/1993 | Hansen |
| 5,297,322 A | 3/1994 | Kraus |
| 5,309,663 A | 5/1994 | Shirley |
| 5,333,965 A | 8/1994 | Mailey |
| 5,339,491 A | 8/1994 | Sims |
| 5,342,139 A | 8/1994 | Hoffman |
| 5,348,356 A | 9/1994 | Moulton |
| 5,368,427 A | 11/1994 | Pfaffinger |
| 5,368,797 A | 11/1994 | Quentin et al. |
| 5,397,206 A | 3/1995 | Sihon |
| 5,407,310 A | 4/1995 | Kassouni |
| 5,446,965 A | 9/1995 | Makridis |
| 5,507,610 A | 4/1996 | Benedetti et al. |
| 5,513,603 A | 5/1996 | Ang et al. |
| 5,524,786 A | 6/1996 | Skudlarek |
| 5,538,079 A | 7/1996 | Pawlick |
| 5,556,808 A | 9/1996 | Williams et al. |
| 5,566,840 A | 10/1996 | Waldner |
| 5,575,601 A | 11/1996 | Skufca |
| 5,577,301 A | 11/1996 | DeMaagd |
| 5,577,779 A | 11/1996 | Dangel |
| 5,580,204 A | 12/1996 | Hultman |
| 5,586,372 A | 12/1996 | Eguchi et al. |

(56) References Cited

U.S. PATENT DOCUMENTS

| | | |
|---|---|---|
| 5,593,265 A | 1/1997 | Kizer |
| 5,601,453 A | 2/1997 | Horchler |
| 5,629,823 A | 5/1997 | Mizuta |
| 5,634,757 A | 6/1997 | Schanz |
| 5,639,140 A | 6/1997 | Labrash |
| 5,657,516 A | 8/1997 | Berg et al. |
| 5,666,749 A | 9/1997 | Waters |
| 5,667,271 A | 9/1997 | Booth |
| 5,670,013 A | 9/1997 | Huang et al. |
| 5,698,276 A | 12/1997 | Mirabitur |
| 5,702,779 A | 12/1997 | Siebelink, Jr. et al. |
| 5,706,559 A | 1/1998 | Oliver |
| 5,736,221 A | 4/1998 | Hardigg et al. |
| 5,765,942 A | 6/1998 | Shirai et al. |
| 5,775,860 A | 7/1998 | Meyer |
| 5,795,118 A | 8/1998 | Osada et al. |
| 5,797,170 A | 8/1998 | Akeno |
| 5,797,714 A | 8/1998 | Oddenino |
| 5,803,646 A | 9/1998 | Weihrauch |
| 5,806,915 A | 9/1998 | Takabatake |
| 5,810,535 A | 9/1998 | Fleckenstein et al. |
| 5,820,292 A | 10/1998 | Fremstad |
| 5,846,631 A | 12/1998 | Nowosiadly |
| 5,915,678 A | 6/1999 | Slocum et al. |
| 5,920,200 A | 7/1999 | Pendse |
| 5,929,382 A | 7/1999 | Moore |
| 5,931,514 A | 8/1999 | Chung |
| 5,934,729 A | 8/1999 | Baack |
| 5,941,673 A | 8/1999 | Hayakawa et al. |
| 5,988,678 A | 11/1999 | Nakamura |
| 6,006,941 A | 12/1999 | Hitchings |
| 6,010,306 A | 1/2000 | Bucher |
| 6,062,763 A | 5/2000 | Sirois et al. |
| 6,073,315 A | 6/2000 | Rasmussen |
| 6,079,083 A | 6/2000 | Akashi |
| 6,095,594 A | 8/2000 | Riddle et al. |
| 6,103,987 A | 8/2000 | Nordquist |
| 6,109,882 A | 8/2000 | Popov |
| 6,152,436 A | 11/2000 | Sonderegger et al. |
| 6,164,603 A | 12/2000 | Kawai |
| 6,193,430 B1 | 2/2001 | Culpepper et al. |
| 6,199,248 B1 | 3/2001 | Akashi |
| 6,202,962 B1 | 3/2001 | Snyder |
| 6,209,175 B1 | 4/2001 | Gershenson |
| 6,209,178 B1 * | 4/2001 | Wiese et al. .................. 24/458 |
| 6,254,304 B1 | 7/2001 | Takizawa et al. |
| 6,264,869 B1 | 7/2001 | Notarpietro et al. |
| 6,283,540 B1 | 9/2001 | Siebelink, Jr. et al. |
| 6,286,214 B1 | 9/2001 | Bean |
| 6,289,560 B1 | 9/2001 | Guyot |
| 6,299,478 B1 | 10/2001 | Jones et al. |
| 6,311,960 B1 | 11/2001 | Pierman et al. |
| 6,318,585 B1 | 11/2001 | Asagiri |
| 6,321,495 B1 | 11/2001 | Oami |
| 6,336,767 B1 | 1/2002 | Nordquist et al. |
| 6,345,420 B1 | 2/2002 | Nabeshima |
| 6,349,904 B1 | 2/2002 | Polad |
| 6,351,380 B1 | 2/2002 | Curlee |
| 6,354,574 B1 | 3/2002 | Oliver et al. |
| 6,354,815 B1 | 3/2002 | Svihla et al. |
| 6,378,931 B1 | 4/2002 | Kolluri et al. |
| 6,398,449 B1 | 6/2002 | Loh |
| 6,470,540 B2 | 10/2002 | Aamodt et al. |
| 6,478,102 B1 | 11/2002 | Puterbaugh |
| 6,484,370 B2 | 11/2002 | Kanie et al. |
| 6,485,241 B1 | 11/2002 | Oxford |
| 6,498,297 B2 | 12/2002 | Samhammer |
| 6,523,229 B2 | 2/2003 | Severson |
| 6,523,817 B2 | 2/2003 | Landry, Jr. |
| 6,533,391 B1 | 3/2003 | Pan |
| 6,543,979 B2 | 4/2003 | Iwatsuki |
| 6,557,260 B1 | 5/2003 | Morris |
| 6,568,701 B1 | 5/2003 | Burdack et al. |
| 6,579,397 B1 | 6/2003 | Spain et al. |
| 6,591,801 B1 | 7/2003 | Fonville |
| 6,609,717 B2 | 8/2003 | Hinson |
| 6,637,095 B2 | 10/2003 | Stumpf et al. |
| 6,658,698 B2 | 12/2003 | Chen |
| 6,662,411 B2 | 12/2003 | Rubenstein |
| 6,664,470 B2 | 12/2003 | Nagamoto |
| 6,668,424 B1 | 12/2003 | Allen |
| 6,677,065 B2 | 1/2004 | Blauer |
| 6,692,016 B2 | 2/2004 | Yokota |
| 6,712,329 B2 | 3/2004 | Ishigami et al. |
| 6,746,172 B2 | 6/2004 | Culpepper |
| 6,757,942 B2 | 7/2004 | Matsui |
| 6,799,758 B2 | 10/2004 | Fries |
| 6,821,091 B2 | 11/2004 | Lee |
| 6,840,969 B2 | 1/2005 | Kobayashi et al. |
| 6,857,676 B2 | 2/2005 | Kawaguchi et al. |
| 6,857,809 B2 | 2/2005 | Granata |
| 6,872,053 B2 | 3/2005 | Bucher |
| 6,908,117 B1 | 6/2005 | Pickett, Jr. et al. |
| 6,932,416 B2 | 8/2005 | Clauson |
| 6,948,753 B2 | 9/2005 | Yoshida et al. |
| 6,951,349 B2 | 10/2005 | Yokota |
| 6,957,939 B2 | 10/2005 | Wilson |
| 6,959,954 B2 | 11/2005 | Brandt et al. |
| 6,966,601 B2 | 11/2005 | Matsumoto et al. |
| 6,971,831 B2 | 12/2005 | Fattori et al. |
| 6,997,487 B2 | 2/2006 | Kitzis |
| 7,000,941 B2 | 2/2006 | Yokota |
| 7,008,003 B1 | 3/2006 | Hirose et al. |
| 7,014,094 B2 | 3/2006 | Alcoe |
| 7,017,239 B2 | 3/2006 | Kurily et al. |
| 7,036,779 B2 | 5/2006 | Kawaguchi et al. |
| 7,055,785 B1 | 6/2006 | Diggle, III |
| 7,055,849 B2 | 6/2006 | Yokota |
| 7,059,628 B2 | 6/2006 | Yokota |
| 7,073,260 B2 | 7/2006 | Jensen |
| 7,089,998 B2 | 8/2006 | Crook |
| 7,097,198 B2 | 8/2006 | Yokota |
| 7,121,611 B2 | 10/2006 | Hirotani et al. |
| 7,144,183 B2 | 12/2006 | Lian et al. |
| 7,172,210 B2 | 2/2007 | Yokota |
| 7,178,855 B2 | 2/2007 | Catron et al. |
| 7,198,315 B2 | 4/2007 | Cass et al. |
| 7,207,758 B2 | 4/2007 | Leon et al. |
| 7,234,852 B2 | 6/2007 | Nishizawa et al. |
| 7,275,296 B2 | 10/2007 | DiCesare |
| 7,306,418 B2 | 12/2007 | Kornblum |
| 7,322,500 B2 | 1/2008 | Maierholzner |
| 7,344,056 B2 | 3/2008 | Shelmon et al. |
| 7,360,964 B2 | 4/2008 | Tsuya |
| 7,369,408 B2 | 5/2008 | Chang |
| 7,435,031 B2 | 10/2008 | Granata |
| 7,454,105 B2 | 11/2008 | Yi |
| 7,487,884 B2 | 2/2009 | Kim |
| 7,493,716 B2 | 2/2009 | Brown |
| 7,500,440 B2 | 3/2009 | Chiu |
| 7,547,061 B2 | 6/2009 | Horimatsu |
| 7,557,051 B2 | 7/2009 | Ryu et al. |
| 7,568,316 B2 | 8/2009 | Choby et al. |
| 7,591,573 B2 | 9/2009 | Maliar et al. |
| D602,349 S | 10/2009 | Andersson |
| 7,614,836 B2 | 11/2009 | Mohiuddin |
| 7,672,126 B2 | 3/2010 | Yeh |
| 7,677,650 B2 | 3/2010 | Huttenlocher |
| 7,727,667 B2 | 6/2010 | Sakurai |
| 7,764,853 B2 | 7/2010 | Yi et al. |
| 7,793,998 B2 | 9/2010 | Matsui et al. |
| 7,802,831 B2 | 9/2010 | Isayama et al. |
| 7,803,015 B2 | 9/2010 | Pham |
| 7,828,372 B2 | 11/2010 | Ellison |
| 7,832,693 B2 | 11/2010 | Moerke et al. |
| 7,862,272 B2 | 1/2011 | Nakajima |
| 7,869,003 B2 | 1/2011 | Van Doren et al. |
| 7,883,137 B2 | 2/2011 | Bar |
| 7,891,926 B2 | 2/2011 | Jackson, Jr. |
| 7,922,415 B2 | 4/2011 | Rudduck et al. |
| 7,946,684 B2 | 5/2011 | Drury et al. |
| 7,959,214 B2 | 6/2011 | Salhoff |
| 8,029,222 B2 | 10/2011 | Nitsche |
| 8,061,861 B2 | 11/2011 | Paxton et al. |

(56) References Cited

U.S. PATENT DOCUMENTS

| | | |
|---|---|---|
| 8,101,264 B2 | 1/2012 | Pace et al. |
| 8,136,819 B2 | 3/2012 | Yoshitsune et al. |
| 8,162,375 B2 | 4/2012 | Gurtatowski et al. |
| 8,203,496 B2 | 6/2012 | Miller et al. |
| 8,203,843 B2 | 6/2012 | Chen |
| 8,206,029 B2 | 6/2012 | Vaucher et al. |
| 8,228,640 B2 | 7/2012 | Woodhead et al. |
| 8,249,679 B2 | 8/2012 | Cui |
| 8,261,581 B2 | 9/2012 | Cerruti et al. |
| 8,263,889 B2 | 9/2012 | Takahashi et al. |
| 8,276,961 B2 | 10/2012 | Kwolek |
| 8,291,553 B2 | 10/2012 | Moberg |
| 8,297,137 B2 | 10/2012 | Dole |
| 8,297,661 B2 | 10/2012 | Proulx et al. |
| 8,312,887 B2 | 11/2012 | Dunn et al. |
| 8,371,788 B2 | 2/2013 | Lange |
| 8,414,048 B1 | 4/2013 | Kwolek |
| 8,424,173 B2 | 4/2013 | Shiba |
| 8,444,199 B2 | 5/2013 | Takeuchi et al. |
| 8,474,214 B2 | 7/2013 | Dawe |
| 8,480,186 B2 | 7/2013 | Wang |
| 8,511,707 B2 | 8/2013 | Amamori |
| 8,572,818 B2 | 11/2013 | Hofmann |
| 8,579,141 B2 | 11/2013 | Tejima |
| 8,619,504 B2 | 12/2013 | Wyssbrod |
| 8,677,573 B2 | 3/2014 | Lee |
| 8,695,201 B2 | 4/2014 | Morris |
| 8,720,016 B2 | 5/2014 | Beaulieu |
| 8,726,473 B2 | 5/2014 | Dole |
| 8,746,801 B2 | 6/2014 | Nakata |
| 8,773,846 B2 | 7/2014 | Wang |
| 8,811,004 B2 | 8/2014 | Liu |
| 8,826,499 B2 | 9/2014 | Tempesta |
| 8,833,771 B2 | 9/2014 | Lesnau |
| 8,833,832 B2 | 9/2014 | Whipps |
| 8,834,058 B2 | 9/2014 | Woicke |
| 8,905,812 B2 | 12/2014 | Pai-Chen |
| 8,910,350 B2 | 12/2014 | Poulakis |
| 9,003,891 B2 | 4/2015 | Frank |
| 9,039,318 B2 | 5/2015 | Mantei et al. |
| 9,050,690 B2 | 6/2015 | Hammer et al. |
| 9,061,403 B2 | 6/2015 | Colombo et al. |
| 9,061,715 B2 | 6/2015 | Morris |
| 9,062,991 B2 | 6/2015 | Kanagaraj |
| 9,067,625 B2 | 6/2015 | Morris |
| 9,194,413 B2 | 11/2015 | Christoph |
| 2001/0016986 A1 | 8/2001 | Bean |
| 2001/0030414 A1 | 10/2001 | Yokota |
| 2001/0045757 A1 | 11/2001 | Hideki et al. |
| 2002/0045086 A1 | 4/2002 | Tsuji et al. |
| 2002/0060275 A1 | 5/2002 | Polad |
| 2002/0092598 A1 | 7/2002 | Jones et al. |
| 2002/0130239 A1 | 9/2002 | Ishigami et al. |
| 2002/0136617 A1 | 9/2002 | Imahigashi |
| 2003/0007831 A1 | 1/2003 | Lian et al. |
| 2003/0059255 A1 | 3/2003 | Kirchen |
| 2003/0080131 A1 | 5/2003 | Fukuo |
| 2003/0082986 A1 | 5/2003 | Wiens et al. |
| 2003/0085618 A1 | 5/2003 | Rhodes |
| 2003/0087047 A1 | 5/2003 | Blauer |
| 2003/0108401 A1 | 6/2003 | Agha et al. |
| 2003/0180122 A1 | 9/2003 | Dobson |
| 2004/0028503 A1 | 2/2004 | Charles |
| 2004/0037637 A1 | 2/2004 | Lian et al. |
| 2004/0052574 A1 | 3/2004 | Grubb |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2004/0262873 A1 | 12/2004 | Wolf et al. |
| 2005/0016116 A1 | 1/2005 | Scherff |
| 2005/0031946 A1 | 2/2005 | Kruger et al. |
| 2005/0042057 A1 | 2/2005 | Konig et al. |
| 2005/0054229 A1 | 3/2005 | Tsuya |
| 2005/0082449 A1 | 4/2005 | Kawaguchi et al. |
| 2005/0109489 A1 | 5/2005 | Kobayashi |
| 2005/0156409 A1 | 7/2005 | Yokota |
| 2005/0156410 A1 | 7/2005 | Yokota |
| 2005/0156416 A1 | 7/2005 | Yokota |
| 2005/0217088 A1 | 10/2005 | Lin |
| 2005/0244250 A1* | 11/2005 | Okada et al. ................. 411/508 |
| 2006/0082187 A1 | 4/2006 | Hernandez et al. |
| 2006/0092653 A1 | 5/2006 | Tachiiwa et al. |
| 2006/0102214 A1 | 5/2006 | Clemons |
| 2006/0110109 A1 | 5/2006 | Yu |
| 2006/0113755 A1 | 6/2006 | Yokota |
| 2006/0125286 A1 | 6/2006 | Horimatsu et al. |
| 2006/0141318 A1 | 6/2006 | MacKinnon et al. |
| 2006/0163902 A1 | 7/2006 | Engel |
| 2006/0170242 A1 | 8/2006 | Forrester et al. |
| 2006/0197356 A1 | 9/2006 | Catron et al. |
| 2006/0202449 A1 | 9/2006 | Yokota |
| 2006/0237995 A1 | 10/2006 | Huttenlocher |
| 2006/0249520 A1 | 11/2006 | Demonte |
| 2006/0264076 A1 | 11/2006 | Chen |
| 2007/0034636 A1 | 2/2007 | Fukuo |
| 2007/0040411 A1 | 2/2007 | Dauvergne |
| 2007/0051572 A1 | 3/2007 | Beri |
| 2007/0113483 A1 | 5/2007 | Hernandez |
| 2007/0113485 A1 | 5/2007 | Hernandez |
| 2007/0126211 A1 | 6/2007 | Moerke et al. |
| 2007/0137018 A1 | 6/2007 | Aigner et al. |
| 2007/0144659 A1 | 6/2007 | De La Fuente |
| 2007/0205627 A1 | 9/2007 | Ishiguro et al. |
| 2007/0227942 A1 | 10/2007 | Hirano |
| 2007/0251055 A1 | 11/2007 | Gerner |
| 2007/0258756 A1 | 11/2007 | Olshausen |
| 2007/0274777 A1 | 11/2007 | Winkler |
| 2007/0292205 A1 | 12/2007 | Duval |
| 2008/0014508 A1 | 1/2008 | Van Doren et al. |
| 2008/0018128 A1 | 1/2008 | Yamagiwa et al. |
| 2008/0073888 A1 | 3/2008 | Enriquez |
| 2008/0094447 A1 | 4/2008 | Drury et al. |
| 2008/0128346 A1 | 6/2008 | Bowers |
| 2008/0217796 A1 | 9/2008 | Van Bruggen et al. |
| 2008/0260488 A1 | 10/2008 | Scroggie et al. |
| 2009/0028506 A1 | 1/2009 | Yi et al. |
| 2009/0072591 A1 | 3/2009 | Baumgartner |
| 2009/0091156 A1 | 4/2009 | Neubrand |
| 2009/0093111 A1 | 4/2009 | Buchwalter et al. |
| 2009/0126168 A1 | 5/2009 | Kobe et al. |
| 2009/0134652 A1 | 5/2009 | Araki |
| 2009/0140112 A1 | 6/2009 | Carnevali |
| 2009/0141449 A1 | 6/2009 | Yeh |
| 2009/0154303 A1 | 6/2009 | Vaucher et al. |
| 2009/0174207 A1 | 7/2009 | Lota |
| 2009/0211804 A1 | 8/2009 | Zhou et al. |
| 2009/0243172 A1 | 10/2009 | Ting et al. |
| 2009/0265896 A1 | 10/2009 | Beak |
| 2009/0309388 A1 | 12/2009 | Ellison |
| 2010/0000156 A1 | 1/2010 | Salhoff |
| 2010/0001539 A1 | 1/2010 | Kikuchi et al. |
| 2010/0021267 A1 | 1/2010 | Nitsche |
| 2010/0061045 A1 | 3/2010 | Chen |
| 2010/0102538 A1 | 4/2010 | Paxton et al. |
| 2010/0134128 A1 | 6/2010 | Hobbs |
| 2010/0147355 A1 | 6/2010 | Shimizu et al. |
| 2010/0162537 A1 | 7/2010 | Shiba |
| 2010/0232171 A1 | 9/2010 | Cannon |
| 2010/0247034 A1 | 9/2010 | Yi et al. |
| 2010/0263417 A1 | 10/2010 | Schoenow |
| 2010/0270745 A1 | 10/2010 | Hurlbert et al. |
| 2010/0307848 A1 | 12/2010 | Hashimoto |
| 2011/0012378 A1 | 1/2011 | Ueno et al. |
| 2011/0036542 A1 | 2/2011 | Woicke |
| 2011/0076588 A1 | 3/2011 | Yamaura |
| 2011/0083392 A1 | 4/2011 | Timko |
| 2011/0103884 A1 | 5/2011 | Shiomoto et al. |
| 2011/0119875 A1 | 5/2011 | Iwasaki |
| 2011/0131918 A1 | 6/2011 | Glynn |
| 2011/0154645 A1 | 6/2011 | Morgan |
| 2011/0175376 A1 | 7/2011 | Whitens et al. |
| 2011/0183152 A1 | 7/2011 | Lanham |
| 2011/0191990 A1 | 8/2011 | Beaulieu |

(56) References Cited

U.S. PATENT DOCUMENTS

| | | |
|---|---|---|
| 2011/0191993 A1 | 8/2011 | Forrest |
| 2011/0207024 A1 | 8/2011 | Bogumil et al. |
| 2011/0239418 A1 | 10/2011 | Huang |
| 2011/0296764 A1* | 12/2011 | Sawatani et al. ............... 49/502 |
| 2011/0311332 A1 | 12/2011 | Ishman |
| 2012/0000291 A1 | 1/2012 | Christoph |
| 2012/0000409 A1 | 1/2012 | Railey |
| 2012/0020726 A1 | 1/2012 | Jan |
| 2012/0073094 A1 | 3/2012 | Bishop |
| 2012/0112489 A1 | 5/2012 | Okimoto |
| 2012/0115010 A1 | 5/2012 | Smith et al. |
| 2012/0187812 A1 | 7/2012 | Gerst |
| 2012/0240363 A1 | 9/2012 | Lee |
| 2012/0251226 A1 | 10/2012 | Liu et al. |
| 2012/0261951 A1 | 10/2012 | Mildner et al. |
| 2012/0301067 A1 | 11/2012 | Morgan |
| 2012/0311829 A1 | 12/2012 | Dickinson |
| 2012/0321379 A1 | 12/2012 | Wang et al. |
| 2012/0324795 A1 | 12/2012 | Krajenke et al. |
| 2013/0010413 A1 | 1/2013 | Kim |
| 2013/0017038 A1 | 1/2013 | Kestner et al. |
| 2013/0019454 A1 | 1/2013 | Colombo et al. |
| 2013/0019455 A1 | 1/2013 | Morris |
| 2013/0027852 A1 | 1/2013 | Wang |
| 2013/0055822 A1 | 3/2013 | Frank |
| 2013/0071181 A1 | 3/2013 | Herzinger et al. |
| 2013/0157015 A1 | 6/2013 | Morris |
| 2013/0212858 A1 | 8/2013 | Herzinger et al. |
| 2013/0269873 A1 | 10/2013 | Herzinger et al. |
| 2013/0287992 A1 | 10/2013 | Morris |
| 2014/0033493 A1 | 2/2014 | Morris et al. |
| 2014/0041176 A1 | 2/2014 | Morris |
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1 | 2/2014 | Colombo et al. |
| 2014/0047697 A1 | 2/2014 | Morris |
| 2014/0132023 A1 | 5/2014 | Watanabe |
| 2014/0172112 A1 | 6/2014 | Marter |
| 2014/0175774 A1 | 6/2014 | Kansteiner |
| 2014/0199116 A1 | 7/2014 | Metten et al. |
| 2014/0202628 A1 | 7/2014 | Sreetharan et al. |
| 2014/0208561 A1 | 7/2014 | Colombo et al. |
| 2014/0208572 A1 | 7/2014 | Colombo et al. |
| 2014/0220267 A1 | 8/2014 | Morris et al. |
| 2014/0264206 A1 | 9/2014 | Morris |
| 2014/0292013 A1 | 10/2014 | Colombo et al. |
| 2014/0298638 A1 | 10/2014 | Colombo et al. |
| 2014/0298640 A1 | 10/2014 | Morris et al. |
| 2014/0298962 A1 | 10/2014 | Morris et al. |
| 2014/0300130 A1 | 10/2014 | Morris et al. |
| 2014/0301103 A1 | 10/2014 | Colombo et al. |
| 2014/0301777 A1 | 10/2014 | Morris et al. |
| 2014/0301778 A1 | 10/2014 | Morris et al. |
| 2014/0360824 A1 | 12/2014 | Morris et al. |
| 2014/0360826 A1 | 12/2014 | Morris et al. |
| 2014/0366326 A1 | 12/2014 | Colombo et al. |
| 2014/0369742 A1 | 12/2014 | Morris et al. |
| 2014/0369743 A1 | 12/2014 | Morris et al. |
| 2015/0016864 A1 | 1/2015 | Morris et al. |
| 2015/0016918 A1 | 1/2015 | Colombo |
| 2015/0023724 A1 | 1/2015 | Morris et al. |
| 2015/0043959 A1 | 2/2015 | Morris |
| 2015/0050068 A1 | 2/2015 | Morris et al. |
| 2015/0052725 A1 | 2/2015 | Morris et al. |
| 2015/0056009 A1 | 2/2015 | Morris |
| 2015/0063943 A1 | 3/2015 | Morris |
| 2015/0069779 A1 | 3/2015 | Morris et al. |
| 2015/0078805 A1 | 3/2015 | Morris et al. |
| 2015/0086265 A1 | 3/2015 | Morris |
| 2015/0093177 A1 | 4/2015 | Morris |
| 2015/0093178 A1 | 4/2015 | Morris |
| 2015/0093179 A1 | 4/2015 | Morris et al. |
| 2015/0098748 A1 | 4/2015 | Morris et al. |
| 2015/0135509 A1 | 5/2015 | Morris et al. |
| 2015/0165609 A1 | 6/2015 | Morris et al. |
| 2015/0165985 A1 | 6/2015 | Morris |
| 2015/0165986 A1 | 6/2015 | Morris |
| 2015/0166124 A1 | 6/2015 | Morris |
| 2015/0167717 A1 | 6/2015 | Morris |
| 2015/0167718 A1 | 6/2015 | Morris et al. |
| 2015/0174740 A1 | 6/2015 | Morris et al. |
| 2015/0175091 A1 | 6/2015 | Morris et al. |
| 2015/0175217 A1 | 6/2015 | Morris et al. |
| 2015/0175219 A1 | 6/2015 | Kiester |
| 2015/0176759 A1 | 6/2015 | Morris et al. |
| 2015/0194650 A1 | 7/2015 | Morris et al. |
| 2015/0197970 A1 | 7/2015 | Morris et al. |
| 2015/0232130 A1 | 8/2015 | Colombo |
| 2015/0232131 A1 | 8/2015 | Morris et al. |
| 2015/0274217 A1 | 10/2015 | Colombo |
| 2015/0291222 A1 | 10/2015 | Colombo et al. |
| 2015/0375798 A1 | 12/2015 | Morris et al. |

FOREIGN PATENT DOCUMENTS

| | | |
|---|---|---|
| CN | 1129162 A | 8/1996 |
| CN | 2285844 Y | 7/1998 |
| CN | 1205285 A | 1/1999 |
| CN | 1204744 A | 7/1999 |
| CN | 1328521 A | 12/2001 |
| CN | 1426872 A | 7/2003 |
| CN | 1496451 A | 5/2004 |
| CN | 2661972 Y | 12/2004 |
| CN | 2679409 Y | 2/2005 |
| CN | 1670986 A | 9/2005 |
| CN | 100573975 C | 9/2005 |
| CN | 1693721 A | 11/2005 |
| CN | 1771399 A | 5/2006 |
| CN | 1774580 A | 5/2006 |
| CN | 2872795 Y | 2/2007 |
| CN | 1933747 A | 3/2007 |
| CN | 2888807 Y | 4/2007 |
| CN | 1961157 A | 5/2007 |
| CN | 2915389 Y | 6/2007 |
| CN | 101005741 A | 7/2007 |
| CN | 200941716 Y | 8/2007 |
| CN | 200957794 Y | 10/2007 |
| CN | 101250964 A | 4/2008 |
| CN | 101390022 A | 3/2009 |
| CN | 201259846 Y | 6/2009 |
| CN | 201268336 Y | 7/2009 |
| CN | 201310827 Y | 9/2009 |
| CN | 201540513 U | 8/2010 |
| CN | 101821534 | 9/2010 |
| CN | 101930253 A | 12/2010 |
| CN | 201703439 U | 1/2011 |
| CN | 201737062 U | 2/2011 |
| CN | 201792722 U | 4/2011 |
| CN | 201818606 U | 5/2011 |
| CN | 201890285 U | 7/2011 |
| CN | 102144102 A | 8/2011 |
| CN | 102235402 A | 11/2011 |
| CN | 202024057 U | 11/2011 |
| CN | 202079532 U | 12/2011 |
| CN | 102313952 A | 1/2012 |
| CN | 202132326 U | 2/2012 |
| CN | 102540855 A | 7/2012 |
| CN | 102756633 | 10/2012 |
| CN | 102803753 A | 11/2012 |
| CN | 202561269 U | 11/2012 |
| CN | 102817892 A | 12/2012 |
| CN | 102869891 A | 1/2013 |
| CN | 202686206 U | 1/2013 |
| CN | 102939022 A | 2/2013 |
| CN | 202764872 U | 3/2013 |
| CN | 202987018 U | 6/2013 |
| CN | 103201525 A | 7/2013 |
| CN | 103206595 A | 7/2013 |
| CN | 103206596 A | 7/2013 |
| CN | 203189459 U | 9/2013 |
| CN | 203344856 U | 12/2013 |
| CN | 104100609 A | 10/2014 |
| CN | 203991175 U | 12/2014 |

(56) References Cited

FOREIGN PATENT DOCUMENTS

| | | |
|---|---|---|
| DE | 1220673 B | 7/1966 |
| DE | 2527023 A1 | 12/1976 |
| DE | 2736012 A1 | 2/1978 |
| DE | 2703897 A1 | 8/1978 |
| DE | 2809746 A1 | 9/1979 |
| DE | 3704190 A1 | 12/1987 |
| DE | 3711696 A1 | 10/1988 |
| DE | 3805693 A1 | 2/1989 |
| DE | 3815927 | 11/1989 |
| DE | 9109276 U1 | 7/1991 |
| DE | 4002443 A1 | 8/1991 |
| DE | 4111245 A1 | 10/1991 |
| DE | 9201258 U1 | 3/1992 |
| DE | 29714892 U1 | 10/1997 |
| DE | 29800379 U1 | 5/1998 |
| DE | 69600357 T2 | 12/1998 |
| DE | 10202644 C1 | 6/2003 |
| DE | 10234253 B3 | 4/2004 |
| DE | 10333540 A1 | 2/2005 |
| DE | 60105817 T2 | 2/2006 |
| DE | 202007006175 U1 | 8/2007 |
| DE | 102008005618 A1 | 7/2009 |
| DE | 102008063920 A1 | 9/2009 |
| DE | 102008047464 A1 | 4/2010 |
| DE | 102010028323 A1 | 11/2011 |
| DE | 102011050003 A1 | 10/2012 |
| DE | 102012212101 B3 | 7/2013 |
| DE | 102013003028 A1 | 3/2014 |
| EP | 0118796 | 9/1984 |
| EP | 0616140 A2 | 9/1994 |
| EP | 132263 A1 | 9/2001 |
| EP | 1243471 A2 | 9/2002 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 1452745 A1 | 9/2004 |
| EP | 1550818 A1 | 7/2005 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A1 | 2/1970 |
| FR | 2750177 A2 | 12/1997 |
| FR | 2942749 A1 | 9/2010 |
| FR | 2958696 A1 | 10/2011 |
| GB | 155838 | 3/1922 |
| GB | 994891 | 6/1965 |
| GB | 2175626 A | 12/1986 |
| GB | 2281950 A | 3/1995 |
| GB | 2348924 A | 10/2000 |
| JP | H08200420 A | 8/1996 |
| JP | H0942233 A | 2/1997 |
| JP | 2000010514 A | 1/2000 |
| JP | 2001141154 A | 5/2001 |
| JP | 2001171554 A | 6/2001 |
| JP | 2003158387 A | 5/2003 |
| JP | 2003314515 A | 11/2003 |
| JP | 2005268004 | 9/2005 |
| JP | 2006205918 | 8/2006 |
| JP | 2008307938 A | 12/2008 |
| JP | 2009084844 | 4/2009 |
| JP | 2009187789 A | 8/2009 |
| JP | 2011085174 A | 4/2011 |
| JP | 2012060791 A | 3/2012 |
| JP | 2012112533 A | 6/2012 |
| KR | 20030000251 A1 | 1/2003 |
| KR | 100931019 B1 | 12/2009 |
| WO | 9602963 A1 | 2/1996 |
| WO | 9822739 A1 | 5/1998 |
| WO | 0055517 A2 | 3/2000 |
| WO | 0132454 A3 | 11/2001 |
| WO | 2004010011 01 | 1/2004 |
| WO | 2007126201 A1 | 11/2007 |
| WO | 2008140659 A1 | 11/2008 |
| WO | 2010105354 A1 | 9/2010 |
| WO | 2011025606 | 3/2011 |
| WO | 2013088447 A1 | 6/2013 |
| WO | 2013191622 A1 | 12/2013 |

OTHER PUBLICATIONS

"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.

"Elastic Averaging in Flexture Mechanisms: A Multi-Beam Paralleaogram Flexture Case-Study" by Shorya Awtar and Edip Sevincer, Proceeding of IDETC/CIE 2006, Paper DETC2006-99752, American Society of Mechnical Engineers (ASME), Sep. 2006.

"Passive Alignment of Micro-Fluidic Chips Using the Principle of Elastic Averaging" by Sitanshu Gurung, Thesis, Louisiana State University, Dept. of Mechnical Engineering, Dec. 2007.

"Precision Connector Assembly Using Elastic Averaging" by Patrick J. Willoughby and Alexander H. Slocum, Massachusetts Institute of technology (MIT), Cambridge, MA, American Society for Precision Engineering, 2004.

"The Design of High Precision Parallel Mechnisms Using Binary Actuation and Elastic Averaging: With Application to MRI Cancer Treatment" by L.M. Devita, J.S. Plante, and S. Dubowsky, 12th IFToMM World Congress (France), Jun. 2007.

Cross-sectional view of a prior art infrared welded assembly of BMW, Munich, Germany. Believed on the market since about Jan. 1, 2010, 1 page.

U.S. Appl. No. 13/915,132, filed Jun. 11, 2013, entitled "Elastically Deformable Energy Management Arrangement and Method of Managing Energy Absorption," inventors: Steven E. Morris, Randy A. Johnson and Jennifer P. Lawall.

U.S. Appl. No. 13/915,177, filed Jun. 11, 2013, entitled "Elastically Deformable Energy Management Assembly and Method of Managing Energy Absorption," inventors: Steven E. Morris, James M. Kushner, Victoria L. Enyedy, Jennifer P.

U.S. Appl. No. 13/917,005, filed Jun. 13, 2013, entitled "Elastic Attachment Assembly and Method of Reducing Positional Variation and Increasing Stiffness," inventors: Steven E Morris and Jennifer P. Lawall.

U.S. Appl. No. 13/917,074, filed Jun. 13, 2013, entitled "Elastically Deformable Retaining Hook for Components to be Mated Together and Method of Assembling", inventors: Joel Colombo, Jeffrey L. Konchan, Steven E. Morris, and Stev.

U.S. Appl. No. 13/939,503, filed Jul. 11, 2013, entitled "Elastically Averaged Alignment Systems and Methods," inventor: Joel Colombo.

U.S. Appl. No. 13/940,912, filed Jul. 12, 2013, entitled "Alignment Arrangement for Mated Components and Method", inventors: Steven E. Morris and Jennifer P. Lawall.

U.S. Appl. No. 13/945,231, filed Jul. 18, 2013, entitled "Lobular Elastic Tube Alignment System for Providing Precise Four-Way Alignment of Components", Inventors: Steven E. Morris and Jennifer P. Lawall.

U.S. Appl. No. 13/954,198, filed Jul. 30, 2013, entitled "Elastic Alignment and Retention System and Method," inventors: Steven E. Morris, Edward D. Groninger, and Raymond J. Chess.

U.S. Appl. No. 13/966,523, filed Aug. 14, 2013, entitled "Elastically Averaged Alignment Systems and Methods Thereof," inventors: Steven E. Morris, Jennifer P. Lawall and Joel Colombo.

U.S. Appl. No. 13/973,587, filed Aug. 22, 2013, entitled "Elastic Averaging Alignment System and Method," inventors: Steven E. Morris and Jennifer P. Lawall.

U.S. Appl. No. 13/974,729, filed Aug. 23, 2013, entitled "Elastic Averaging Snap Member Aligning and Fastening System", inventors: Steven E. Morris and Jennifer P. Lawall.

Chinese Office Action for Application No. 201410430041.4 dated Dec. 2, 2015; 5 pages.

(56) References Cited

OTHER PUBLICATIONS

Rojas, F.E., et al., "Kinematic Coupling for Precision Fixturing & Assembly" MIT Precision Engineering Research Group, Apr. 2013; 24 pgs.

Slocum, A.H., et al., "Kinematic and Elastically Averaged Joints: Connecting the Past, Present and Future" International Symposium on Ultraprecision Engineering and Nanotechnology, Tokyo, Japan, Mar. 13, 2013; 4 pgs.

Willoughby, P., "Elastically Averaged Precision Alignment", Degree of Doctor of Philosophy in Mechanical Engineering Dissertation, Massachusetts Institute of Technology, 2005; 158 pgs.

* cited by examiner

ELASTICALLY DEFORMABLE ALIGNMENT FASTENER AND SYSTEM

FIELD OF THE INVENTION

The subject invention relates to the art of alignment systems, more particularly to an elastically averaged alignment system, and even more particularly to an elastically averaging alignment fastener for use in an elastically averaged alignment system providing fastening and four-way alignment of mating components on which the alignment system is incorporated.

BACKGROUND

Currently, components, particularly vehicular components such as those found in automotive vehicles, which are to be mated and fastened together in a manufacturing process are mutually located with respect to each other by alignment features that are oversized and/or undersized to provide spacing to freely move the components relative to one another to align them without creating an interference therebetween that would hinder the manufacturing process. One example includes two-way and/or four-way female alignment features in each component, typically circular apertures, which are aligned to receive corresponding male alignment and attachment features. There is a clearance between the male alignment features and their respective female alignment features which is predetermined to match anticipated size and positional variation tolerances of the male and female alignment features as a result of manufacturing (or fabrication) variances. As a result, significant positional variation can occur between the mated first and second components having the aforementioned alignment features, which may contribute to the presence of undesirably large variation in their alignment, particularly with regard to the gaps and spacing between them. In the case where these misaligned components are also part of another assembly, such misalignments can also affect the function and/or aesthetic appearance of the entire assembly. Regardless of whether such misalignment is limited to two components or an entire assembly, it can negatively affect function and result in a perception of poor quality.

To align and secure components, the aforementioned male and female alignment features may be employed in combination with separate push pin components that serve to secure the components to each other. In such an assembly, the mating components are located relative to each other by the alignment features, and are fixed relative to each other by the separate push pin components. Use of separate alignment features and push pin components, one for alignment and the other for securement, may limit the effectiveness of each on a given assembly, as the alignment features cannot be employed where the securement components are employed.

Accordingly, the art of alignment and fastening systems can be enhanced by providing a precise alignment and fastening system that can ensure precise four-way alignment and fastening of two components via elastic averaging of a single elastically deformable alignment fastener disposed in fastening engagement with a corresponding single alignment feature.

SUMMARY OF THE INVENTION

In one exemplary embodiment of the invention an elastically deformable alignment fastener is provided in the form of a unitary object having a head portion and an integrally formed body portion. The body portion has an elastically deformable lobular hollow tube having a proximal end proximate the head portion and a distal end axially displaced from the head portion. The lobular hollow tube has an outer surface having one or more retention features oriented to provide a plurality of radially extending engagement surfaces along a length of the hollow tube. The head portion has a flange that circumscribes the proximal end of the lobular hollow tube. Portions of the elastically deformable lobular hollow tube when inserted into circular apertures of first and second components elastically deform to an elastically averaged final configuration that aligns the first and second components in four planar orthogonal directions.

In another exemplary embodiment of the invention an elastically averaged alignment system is provided having a first component, a second component, and an elastically deformable alignment fastener. The first component has a first alignment member and a first aperture. The second component has a second alignment member and a second aperture, the second aperture being configured and disposed to align with the first aperture when the first and second components are assembled together. The elastically deformable alignment fastener is in the form of a unitary object having a head portion and an integrally formed body portion. The body portion has an elastically deformable lobular hollow tube having a proximal end proximate the head portion and a distal end axially displaced from the head portion. The lobular hollow tube has an outer surface with one or more retention features oriented to provide a plurality of radially extending engagement surfaces along a length of the hollow tube. The head portion has a flange that circumscribes the proximal end of the lobular hollow tube. Portions of the elastically deformable lobular hollow tube when inserted into the first and second apertures of the first and second components elastically deform to an elastically averaged final configuration that aligns the first and second components in at least two planar orthogonal directions.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
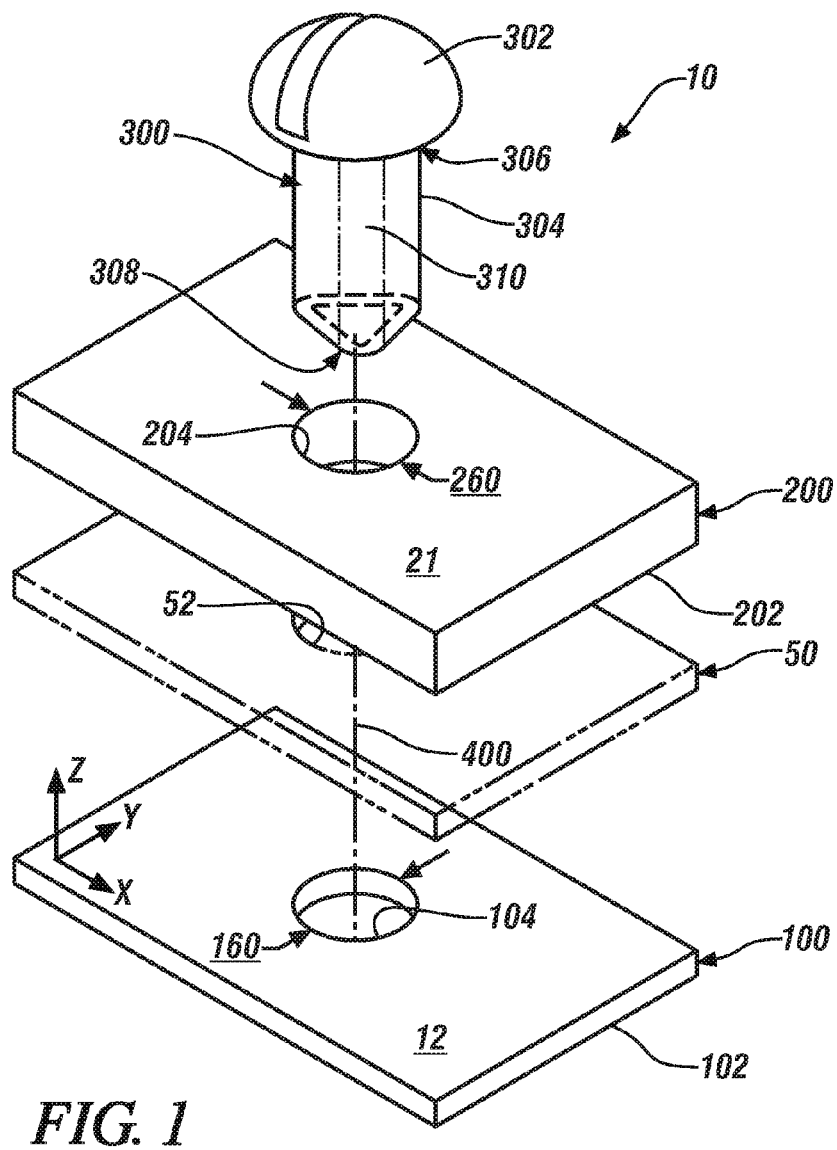
FIG. 1 depicts an isometric perspective view of a disassembled assembly of an elastically averaged alignment system having an elastically averaging alignment fastener, in accordance with an embodiment of the invention.

The following description is merely exemplary in nature and is not intended to limit the present disclosure, its application or uses. For example, an embodiment shown comprises a vehicle body panel, but the alignment system may be used with any suitable components to provide elastic averaging for precision location, alignment and fastening of all manner of mating components and component applications, including many industrial, consumer product (e.g., consumer electronics, various appliances and the like), transportation, energy and aerospace applications, and particularly including many other types of vehicular components and applications, such as various interior, exterior and under hood vehicular components and applications. It should be understood that throughout the drawings, corresponding reference numerals indicate like or corresponding parts and features.

As used herein, the term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. patent application Ser. No. 13/187,675, the disclosure of which is incorporated by reference herein in its entirety. The embodiments disclosed above provide the ability to convert an existing component that is not compatible with the above-described elastic averaging principles, or that would be further aided with the inclusion of a four-way elastic averaging fastening system as herein disclosed, to an assembly that does facilitate elastic averaging and the benefits associated therewith.

Any suitable elastically deformable material may be used for the mating components and alignment features disclosed herein and discussed further below, particularly those materials that are elastically deformable when formed into the features described herein. This includes various metals, polymers, ceramics, inorganic materials or glasses, or composites of any of the aforementioned materials, or any other combinations thereof suitable for a purpose disclosed herein. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS). The material may be in any form and formed or manufactured by any suitable process, including stamped or formed metal, composite or other sheets, forgings, extruded parts, pressed parts, castings, or molded parts and the like, to include the deformable features described herein. The elastically deformable alignment features and associated component may be formed in any suitable manner. For example, the elastically deformable alignment features and the associated component may be integrally formed, or they may be formed entirely separately and subsequently attached together. When integrally formed, they may be formed as a single part from a plastic injection molding machine, for example. When formed separately, they may be formed from different materials to provide a predetermined elastic response characteristic, for example. The material, or materials, may be selected to provide a predetermined elastic response characteristic of any or all of the elastically deformable alignment features, the associated component, or the mating component. The predetermined elastic response characteristic may include, for example, a predetermined elastic modulus.

As used herein, the term vehicle is not limited to just an automobile, truck, van or sport utility vehicle, but includes any self-propelled or towed conveyance suitable for transporting a burden.

In accordance with an exemplary embodiment of the invention, and with reference to FIG. 1, an elastically averaged alignment system 10 includes a first component 100 having a first alignment member 102 and a first aperture 104 having a first diameter 160, a second component 200 having a second alignment member 202 and a second aperture 204 having a second diameter 260, and an elastically deformable alignment fastener 300 formed as a unitary object having a head portion 302 and an integrally formed body portion 304. The second aperture 204 is configured and disposed to align with the first aperture 104 when the first and second components 100, 200 are assembled together, as indicated by dash-dot assembly line 400. In an embodiment, the first and second apertures 104, 204 are circular apertures. A third component 50 is depicted in dash-double-dash line in FIG. 1, and represents the inclusion of one or more additional components, in addition to the first and second components 100, 200, in the elastically averaged alignment system 10. In an embodiment, the third component 50 includes a third aperture 52 configured and disposed to align with the first and second apertures 104, 204 when the first, second and third components 100, 200, 50 are assembled together.

For discussion purposes, the mating side of the first alignment member 102 visible in FIG. 1 is labeled 12, and the non-mating side of the second alignment member 202 visible in FIG. 1 is labeled 21. The non-visible sides of the first and second alignment members 102, 202 that are hidden from view in FIG. 1 are herein referred to by reference labels 11 and 22, respectively. For discussion purposes, a plan view of the elastically averaged alignment system 10 as viewed from side 21 of the second component 200 is herein referred to as a front view, and a plan view of the elastically averaged alignment system 10 as viewed from side 11 of the first component 100 is herein referred to as a rear view.

The body portion 304 has a form of an elastically deformable lobular hollow tube having a proximal end 306 proximate the head portion 302 and a distal end 308 axially displaced from the head portion 302. In an embodiment, the lobular hollow tube, also herein referred to by reference numeral 304, further may include a taper at the distal end 308, which may be created by a draft angle formed on the walls of a plastic injection molding machine configured to mold the elastically deformable alignment fastener 300, for example, or may be created by a chamfer formed on the distal end 308 of the lobular hollow tube 304. In accordance with an embodiment of the invention, the lobular hollow tube 304 has an outer surface 310 having one or more retention features 312.1, 312.2, 312.3, 312.4 (best seen with reference to FIGS. 2-5) oriented to provide a plurality of radially extending engagement surfaces along a length of the lobular hollow tube 304. The head portion 302 comprises a flange 314 that circumscribes the proximal end 306 of the lobular hollow tube 304. Portions of the elastically deformable lobular hollow tube 304 when inserted into the first and second apertures 104, 204 of the first and second components 100, 200 elastically deform to an elastically averaged final configuration that precisely aligns the first and second components 100, 200 in either four or two planar orthogonal directions, such as the +/−x-direction and/or the +/−y-direction of an orthogonal coordinate system, for example, which are herein respectively referred to as four-way and two-way alignment, depending on whether the first and second apertures 104, 204 are, respectively, circular apertures or slotted apertures.

Figure 2:
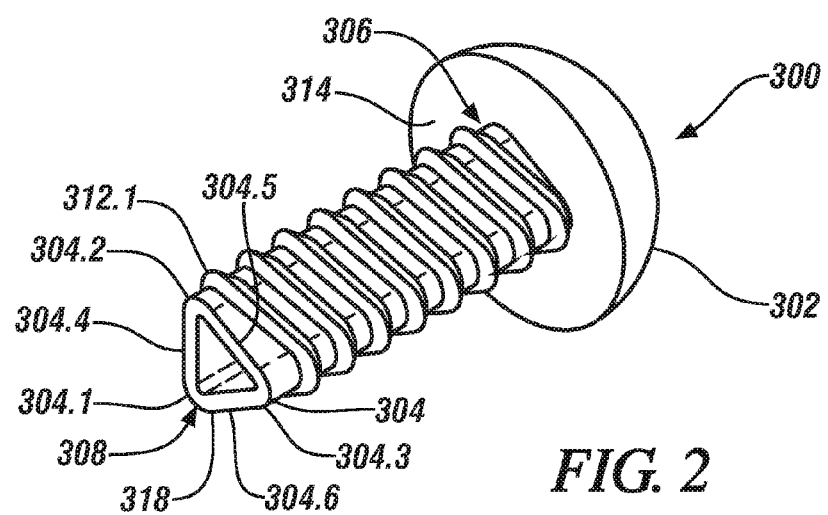
FIG. 2 depicts an isometric perspective view of an elastically averaging alignment fastener, in accordance with an embodiment of the invention.

In an embodiment, and with reference to FIG. 2, the lobular hollow tube 304 has three lobes (also herein referred to as apex wall portions) 304.1, 304.2, 304.3 equally distributed about a central axis 316 (best sees with reference to FIG. 6) of the lobular hollow tube 304, and interconnected by three connecting wall portions 304.4, 304.5, 304.6, which is herein referred to as a tri-lobular hollow tube 304.

The one or more retention features 312.1, 312.2, 312.3, 312.4 may take the form of ribs or serrations 312.1 (see FIG. 2 for example), notches or indentations 312.2 (see FIG. 3 for example), projections 312.3 (see FIG. 4 for example), helical ribs or notches 312.4 (see FIG. 5 for example), or any combination of ribs, serrations, notches, indentations, projections, or helical ribs or notches suitable for providing a radially extending engagement surface on at least the outer surface of each lobe 304.1, 304.2, 304.3 of the lobular hollow tube 304.

Figure 6:
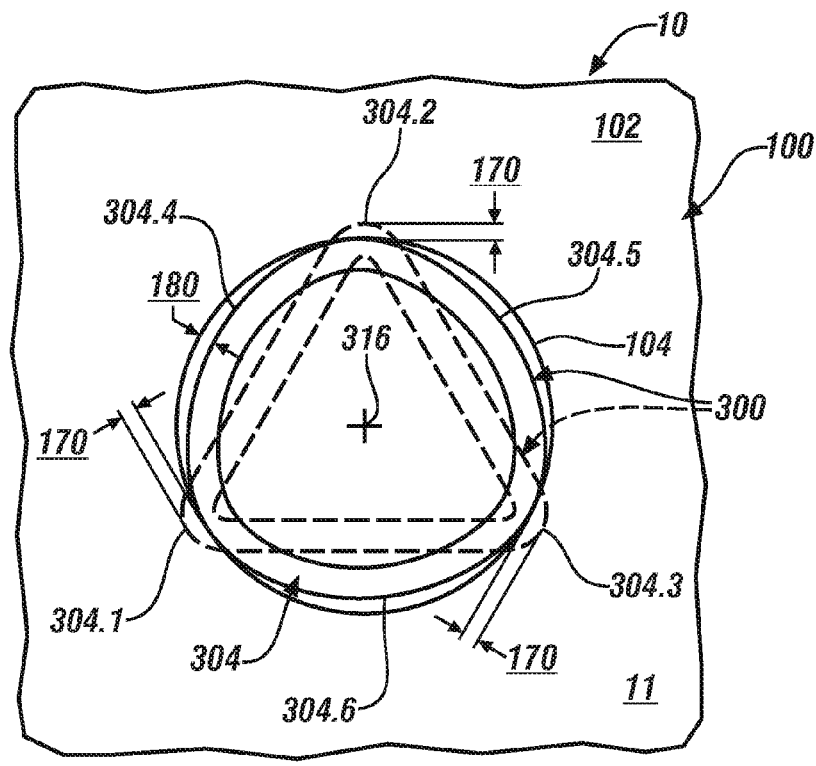
FIG. 6 depicts a rear plan view of a portion of the system of FIG. 1, in accordance with an embodiment of the invention.
Figure 7:
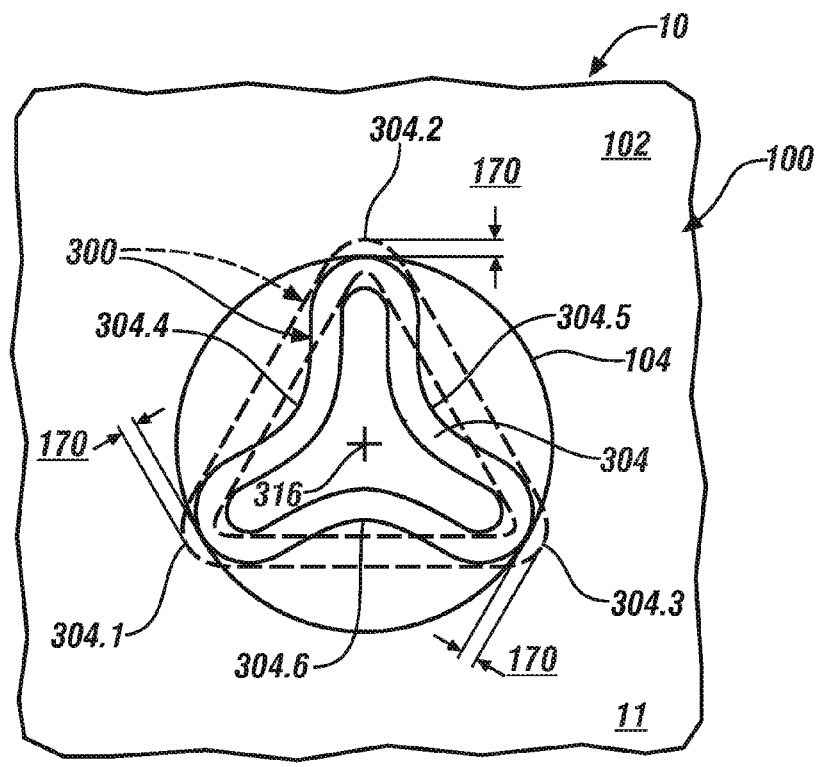
FIG. 7 depicts an alternative rear plan view of a portion of the system of FIG. 1, in accordance with an embodiment of the invention.

FIGS. 6 and 7 each depict a partial rear plan view, as viewed from side 11 of the first component 100 depicted in FIG. 1, of the elastically averaged alignment system 10 in an assembled state with the second component 200 fastened to the first component 100 via the elastically deformable alignment fastener 300 that is interferingly, deformably and matingly engaged with the circular aperture 104 of the first component 100. While the retention features 312.1, 312.2, 312.3, 312.4 are omitted from FIGS. 6 and 7 for clarity, it will be appreciated that any of the foregoing retention features may be employed in accordance with an embodiment of the invention. In FIGS. 6 and 7, the dashed lines represent a pre-engagement shape of the tri-lobular hollow tube 304 of the elastically deformable alignment fastener 300, and the correlating solid lines represent a fully-deformed shape of the tri-lobular hollow tube 304 during a particular stage of the assembly. In accordance with an embodiment of the invention, the outer surfaces of the three apex wall portions 304.1 304.2 304.3 are sized to create an interference fit with the circular aperture 104 of the first alignment member 102, which can be seen from the pre-engagement shape of the tri-lobular hollow tube 304 having an interference dimension 170 between each of the three apex wall portions 304.1, 304.2, 304.3 and the circular aperture 104, where dimension 170 is greater than zero (dimension 170>0). In an embodiment, the material of the first component 100 is thin gage sheet metal, and the spacing 340 (see FIG. 4 for example) between adjacent ones of respective retention features 312.1, 312.3, or the width 350 (see FIG. 3 for example) of respective retention features 312.2, 312.4, is appropriately sized to engage with the sheet metal thickness and provide a snap-fit-like engagement between the retention features on the apex wall portions and the inner diameter of the circular aperture 104 as the elastically deformable alignment fastener 300 is pressed through the circular apertures 204, 104 of the second and first components 200, 100, respectively.

Figure 8:
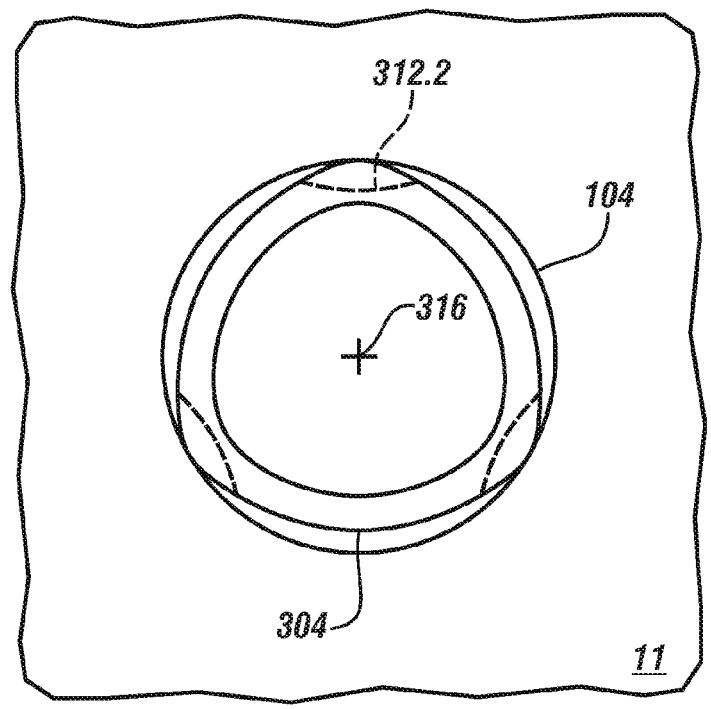
FIG. 8 depicts a rear plan view similar to that of FIG. 6, but illustrating the elastically averaging alignment fastener of FIG. 3 in a fully deformed state, in accordance with an embodiment of the invention.
Figure 9:
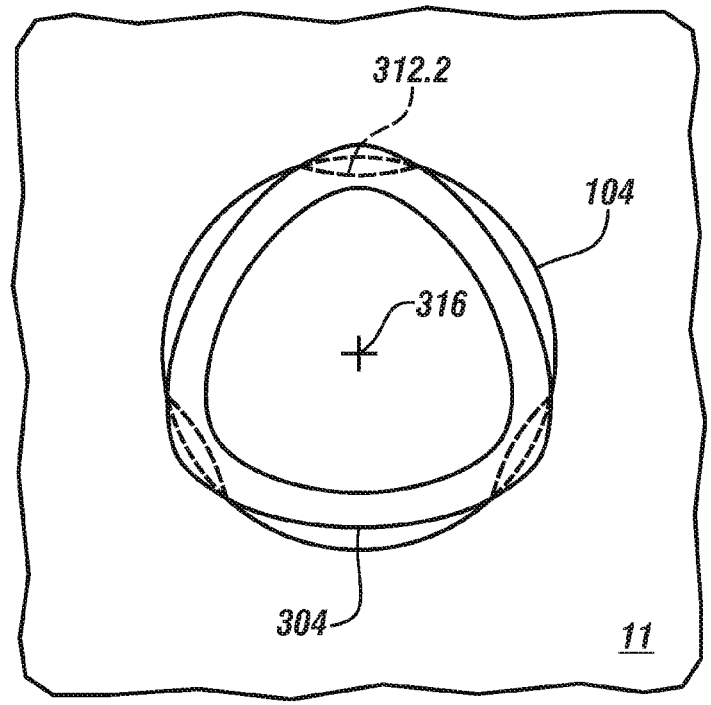
FIG. 9 depicts a rear plan view similar to that of FIG. 8, but illustrating the elastically averaging alignment fastener in a final post-engaged state of deformation, in accordance with an embodiment of the invention.

Reference is now made to FIGS. 8 and 9 in combination with FIG. 6, where FIGS. 8 and 9 depict rear plan views similar to that of FIG. 6 from side 22 of the first alignment member 102, and illustrating the hidden retention features 312.2 of tri-lobular hollow tube 304 (see FIG. 3 for example) by dashed lines, in a fully deformed state of deformation (FIG. 8), and in a final post-engaged state of deformation (FIG. 9). In an embodiment, the interference dimension 170 (see FIG. 6) may be sized such that the tri-lobular hollow tube 304 first deforms from the pre-engagement shape (dashed line representation in FIG. 6) to the fully-deformed shape (solid line representation in FIG. 6, and illustration of FIG. 8) as the elastically deformable alignment fastener 300 is interferingly engaged with the circular aperture 104, and then snaps back toward the pre-engagement shape close to the pre-engagement shape, with a slight interference when the elastically deformable alignment fastener 300 is seated in the retention features 312.2 as the retention features 312.2 become aligned with the edge of the circular aperture 104 (FIG. 9). As such, the final post-engagement shape of the tri-lobular hollow tube 304 (FIG. 9), when the retention features 312.2 are engaged with the edge of the circular aperture 104, may have a shape that is between the pre-engagement shape (dashed line representation in FIG. 6) and the fully-deformed shape (solid line representation in FIG. 6, and illustration of FIG. 8), thereby resulting in the tri-lobular hollow tube 304 being at least partially deformed (FIG. 9) to provide a fastening arrangement where the elastically deformable fastener 300 remains interferingly, deformably and matingly engaged with the first component 100 when securing the second component 200 to the first component 100.

Figure 12:
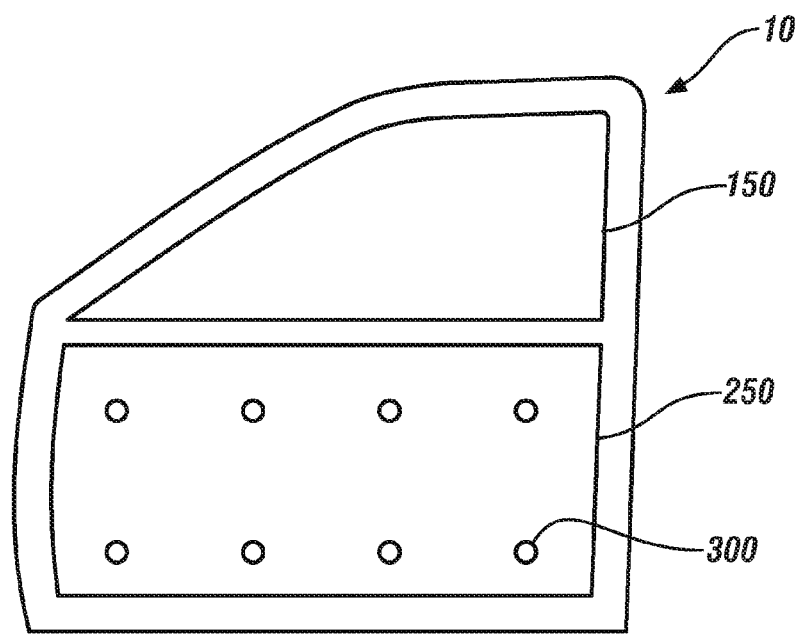
FIG. 12 depicts a door assembly of a vehicle employing an elastically averaged alignment system having an elastically averaging alignment fastener, in accordance with an embodiment of the invention.

While FIGS. 6 and 7 depict an interference dimension 170 for each of the three apex wall portions 304.1, 304.2, 304.3, implying an equal interference dimension for each, it will be appreciated that the scope of the invention is not so limited, and also encompasses different interference conditions 170a, 170b, 170c for each of the three apex wall portions 304.1, 304.2, 304.3, respectively, which would still result in an elastically averaged alignment system 10 where a plurality of elastically deformable fasteners 300 are employed (see FIG. 12 for example depicting a plurality of elastically deformable fasteners 300).

Figure 3:
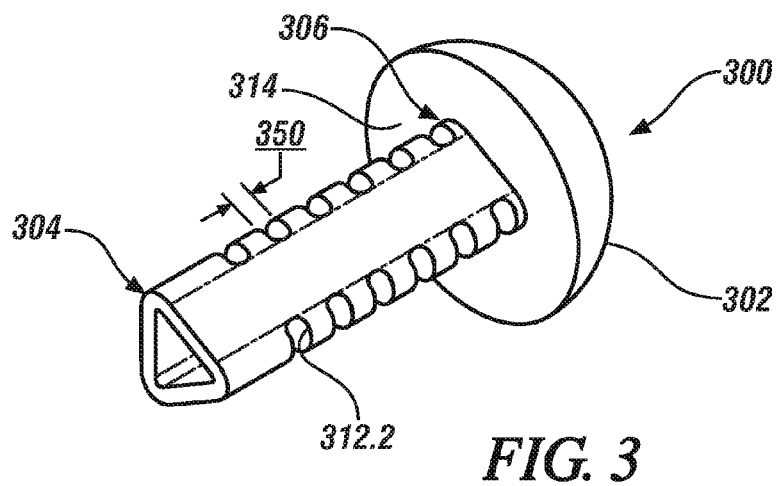
FIG. 3 depicts an isometric perspective view of another elastically averaging alignment fastener, in accordance with an embodiment of the invention.
Figure 4:
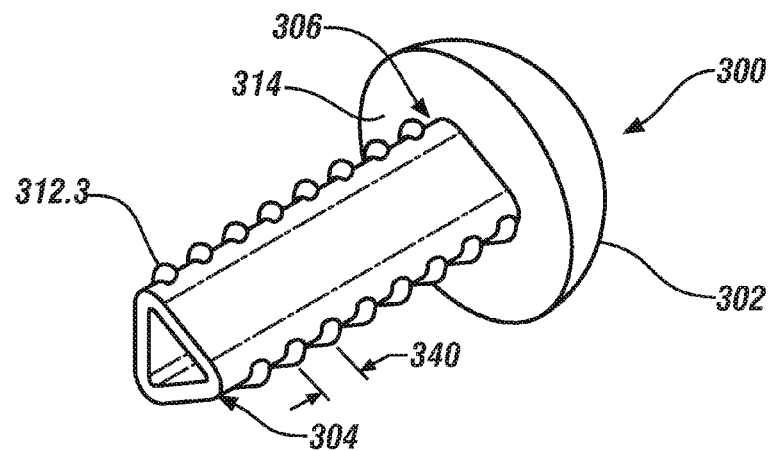
FIG. 4 depicts an isometric perspective view of another elastically averaging alignment fastener, in accordance with an embodiment of the invention.
Figure 5:
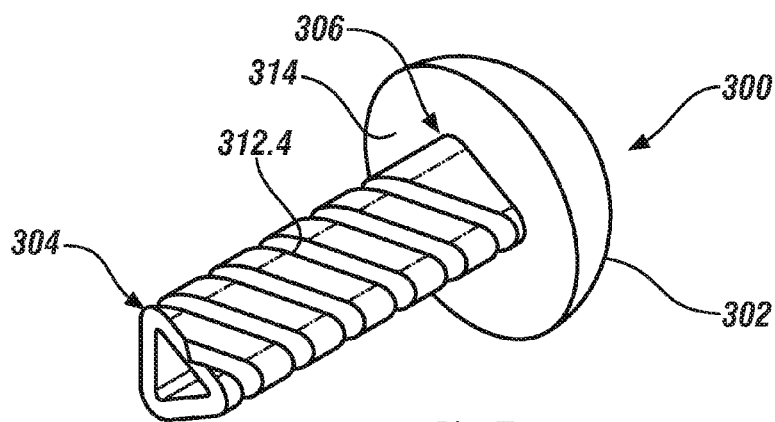
FIG. 5 depicts an isometric perspective view of another elastically averaging alignment fastener, in accordance with an embodiment of the invention.

While FIGS. 8 and 9 illustrate retention features 312.2 of the tri-lobular hollow tube 304 of FIG. 3, it will be appreciated that the scope of the invention is not so limited, and that the foregoing description of a pre-engagement shape, a fully deformed shape, and a final post-engagement shape, is equally applicable to the other retention features 312.1, 312.3 and 312.4, as depicted in FIGS. 2, 4 and 5, respectively.

In accordance with an embodiment of the invention, and with reference back to FIG. 6, the connecting wall portions 304.4, 304.5, 304.6 are sized to fit within the circular aperture 104 with a clearance dimension 180 therebetween (depicted in FIG. 6 in only one location, but understood to apply to all three similar locations), where dimension 180 is equal to or greater than zero (dimension 180≥0). In the embodiment depicted in FIG. 6, the connecting wall portions 304.4, 304.5 304.6 are configured to elastically deform away from the central axis 316 of the tri-lobular hollow tube 304. In the embodiment of FIG. 7, the connecting wall portions 304.4, 304.5, 304.6 are configured to elastically deform toward the central axis 316 of the tri-lobular hollow tube 304.

While FIGS. 6 and 7 both depict the connecting wall portions 304.4, 304.5, 304.6 all deforming in a same direction (all outward in FIG. 6, and all inward in FIG. 7), it will be appreciated that the scope of the invention is not so limited and also encompasses an embodiment where the connecting wall portions 304.4, 304.5, 304.6 are configured to elastically deform in a combined arrangement that includes elastic deformation toward and away from the central axis 316 of the tri-lobular hollow tube 304.

In the embodiment depicted in FIG. 6 where the connecting wall portions 304.4, 304.5, 304.6 all deform outward during assembly of the first and second components 100, 200, it will be appreciated that an embodiment involves an arrangement where an outer perimeter 318 of a pre-engaged tri-lobular hollow tube 304 (best seen with reference to FIG. 2) must have a length that is less than a circumference of the circular aperture 104 in order to permit, albeit with elastically averaged deformation, insertion of the tri-lobular hollow tube 304 into the circular aperture 104 when the tri-lobular hollow tube 304 is interferingly, deformably and matingly engaged with the circular aperture 104 with outward deformation of the connecting wall portions 304.4, 304.5, 304.6. That is, when the connecting wall portions 304.4, 304.5, 304.6 of the tri-lobular hollow tube 304 are outwardly deformed by compression of the apex wall portions 304.1, 304.2, 304.3 such that the connecting wall portions and apex wall portions completely fill the opening of the circular aperture 104, the outer perimeter 318 of the now fully-deformed tri-lobular tube 304 must be sized to fit within the opening of the circular aperture 104, and therefore the outer perimeter 318 of the tri-lobular hollow tube 304 must be smaller in length than the circumference of the circular aperture 104 in order to avoid a line-on-line interference condition of the engaging surfaces.

Figure 10:
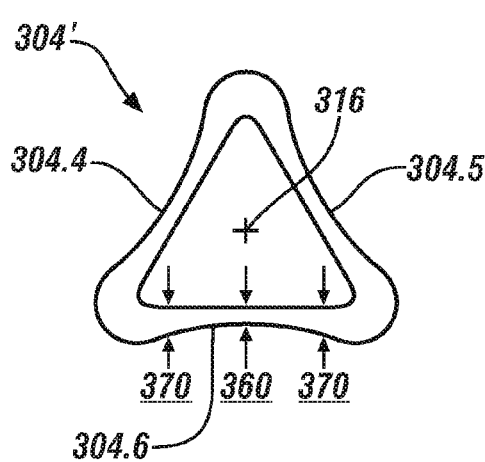
FIG. 10 depicts a rear plan view of a tri-lobular body of an elastically averaging alignment fastener, in accordance with an embodiment of the invention.
Figure 11:
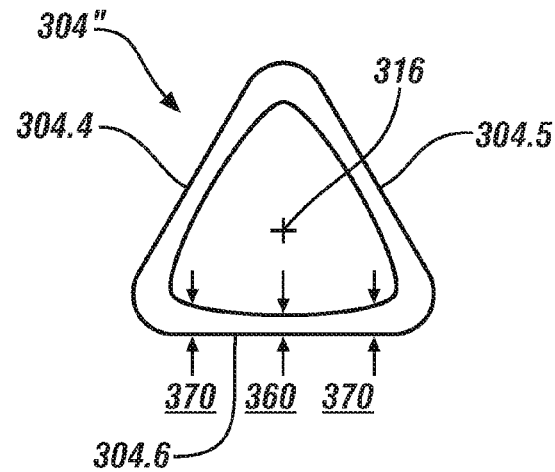
FIG. 11 depicts a rear plan view of another tri-lobular body of an elastically averaging alignment fastener, in accordance with an embodiment of the invention.

Reference is now made to FIGS. 10 and 11, which depict distal end plan views of alternative tri-lobular hollow tubes 304', 304" consistent with an embodiment of the invention disclosed herein. Both versions of the tri-lobular hollow tubes 304', 304" have connecting wall portions 304.4, 304.5, 304.6 that are thinner in the middle section than at the end sections, as indicated by references numerals 360 and 370, where thickness 360<thickness 370, or more generally where thickness 360≠thickness 370. In the embodiment of FIG. 10, the outer surfaces of the connecting wall portions 304.4, 304.5, 304.6 are convex with respect to the central axis 316 of the tri-lobular hollow tube 304', which is contemplated to facilitate elastic deformation of the tri-lobular hollow tube 304' in the manner depicted in FIG. 7. In the embodiment of FIG. 11, the inner surfaces of the connecting wall portions 304.4, 304.5, 304.6 are concave with respect to the central axis 316 of the tri-lobular hollow tube 304", which is contemplated to facilitate elastic deformation of the tri-lobular hollow tube 304" in the manner depicted in FIG. 6. By controlling the direction of elastic deformation of the connecting wall portions 304.4, 304.5, 304.6 (inward or outward for example), it is contemplated that the overall elastic averaging achieved by the elastically averaging alignment system 10 will be more predictable as compared to a system having elastic deformation in random directions.

In view of the foregoing, it will be appreciated that there may be many applications where one or more elastically deformable alignment fasteners 300 may be utilized in an elastically averaged alignment system 10 to not only align but also fasten first and second components 100, 200 together. In one embodiment, and with reference to FIG. 12, an exemplary first component may be a door assembly 150 of a vehicle formed out of, for example, sheet metal and having a plurality of first circular apertures 104 (best seen with reference to FIG. 1) formed therein, and an exemplary second component may be a sound absorbing material 250 having a plurality of second circular apertures 204 (best seen with reference to FIG. 1) formed therein and arranged to align with the plurality of first circular apertures 104. In a manner disclosed herein, and in accordance with an embodiment of the invention, a plurality of elastically deformable alignment fasteners 300 are employed to interferingly, deformably, and matingly engage with the sheet metal of the door 150 to fasten the sound absorbing material 250 to the door 150 between the flange 314 and the one or more retention features 312 of each of the plurality of elastically deformable alignment fasteners 300. By using a plurality of elastically deformable alignment fasteners 300, added precision in the alignment of the first and second components 100, 200 can result.

While embodiments have been described and illustrated herein with reference to elastically deformable alignment fasteners 300 as an elastic averaging alignment feature, it will be appreciated that the scope of the invention is not limited to the use of elastically deformable alignment fasteners 300 by themselves, but also encompasses the use of elastically deformable alignment fasteners 300 in combination with other elastic averaging alignment features, such as, for example, those disclosed in commonly owned, co-pending U.S. patent application Ser. No. 13/187,675.

In an embodiment, the first diameter 160 of the first aperture 104 in the first component 100 is smaller than second diameter 260 of the second aperture in the second component 200, that is first diameter 160<second diameter 260, which would allow the retention features 312.1, 312.2, 312.3, 312.4 to snap-fit engage with the first aperture 104 while slidably engaging with the second aperture 204. In another embodiment, second diameter 260 of the second aperture 204 in the second component 200 is sized to create an interference fit with the elastically deformable alignment fastener 300 at one or more locations (with particular reference being made to the plurality of elastically deformable alignment fasteners 300 depicted in FIG. 12) to better align the second component 200 with the first component 100.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastically deformable alignment fastener configured to be inserted into circular apertures of first and second components, the elastically deformable alignment fastener comprising:
   an object having a head portion and a body portion;
   wherein the body portion comprises an elastically deformable lobular hollow tube having a proximal end proximate the head portion and a distal end axially displaced from the head portion;
   wherein the lobular hollow tube is tri-lobular;
   wherein the lobular hollow tube has an outer surface comprising one or more retention features oriented to provide a plurality of radially extending engagement surfaces along a length of the hollow tube;
   wherein the head portion comprises a flange that circumscribes the proximal end of the lobular hollow tube; and
   wherein portions of the elastically deformable lobular hollow tube when inserted into the circular apertures of the first and second components are adapted to elastically deform to an elastically averaged final configuration that aligns the first and second components in four planar orthogonal directions.

2. The elastically deformable alignment fastener of claim 1, wherein:
   the plurality of radially extending engagement surfaces are disposed on the outer surface of each lobe of the lobular hollow tube.

3. The elastically deformable alignment fastener of claim 1, wherein:
   the retention features comprise ribs, projections, notches, indentations, serrations, or any combination of ribs, projections, notches, indentations and serrations.

4. The elastically deformable alignment fastener of claim 1, wherein:
   the object is a unitary object having the head portion and the body portion integrally formed.

5. An elastically deformable alignment fastener configured to be inserted into circular apertures of first and second components, the elastically deformable alignment fastener comprising:
   an object having a head portion and a body portion;
   wherein the body portion comprises an elastically deformable lobular hollow tube having a proximal end proximate the head portion and a distal end axially displaced from the head portion;
   wherein the lobular hollow tube has an outer surface comprising one or more retention features oriented to provide a plurality of radially extending engagement surfaces along a length of the hollow tube;
   wherein the head portion comprises a flange that circumscribes the proximal end of the lobular hollow tube;
   wherein portions of the elastically deformable lobular hollow tube when inserted into the circular apertures of the first and second components are adapted to elastically deform to an elastically averaged final configuration that aligns the first and second components in four planar orthogonal directions; and
   wherein the lobular hollow tube comprises a tube wall having three apex wall portions equally distributed about a central axis of the lobular hollow tube and three connecting wall portions interconnected therebetween, wherein the three apex wall portions have a size adapted to interferingly, deformably and matingly fit within a defined circular aperture of the first component, wherein the connecting wall portions have a size adapted to fit within the defined circular aperture with clearance therebetween, and wherein the connecting wall portions are configured to elastically deform toward the central axis of the lobular hollow tube, away from the central axis of the lobular hollow tube, or in a combination that includes elastic deformation toward and away from the central axis of the lobular hollow tube when the lobular hollow tube is engaged with and is elastically deformed with respect to the circular apertures of the first and second components.

6. The elastically deformable alignment fastener of claim 5, wherein the three connecting wall portions each comprise a wall surface that is curved inward toward the central axis of the lobular hollow tube.

7. The elastically deformable alignment fastener of claim 5, wherein the three connecting wall portions each comprise a wall surface that is curved outward away from the central axis of the lobular hollow tube.

8. The elastically deformable alignment fastener of claim 5, wherein:
   the object is a unitary object having the head portion and the body portion integrally formed.

9. An elastically averaged alignment system, comprising:
a first component comprising a first alignment member and a first aperture;
a second component comprising a second alignment member and a second aperture, the second aperture being configured and disposed to align with the first aperture when the first and second components are assembled together; and
an elastically deformable alignment fastener comprising an object having a head portion and a body portion;
wherein the body portion comprises an elastically deformable lobular hollow tube having a proximal end proximate the head portion and a distal end axially displaced from the head portion;
wherein the lobular hollow tube is tri-lobular;
wherein the lobular hollow tube has an outer surface comprising one or more retention features oriented to provide a plurality of radially extending engagement surfaces along a length of the hollow tube;
wherein the head portion comprises a flange that circumscribes the proximal end of the lobular hollow tube; and
wherein portions of the elastically deformable lobular hollow tube are configured to be inserted into the first and second apertures of the first and second components, and when inserted into the first and second apertures of the first and second components elastically deform to an elastically averaged final configuration that aligns the first and second components in at least two planar orthogonal directions.

10. The elastically averaged alignment system of claim 9, wherein:
each of the first and second apertures are circular apertures; and
portions of the elastically deformable lobular hollow tube when inserted into the first and second circular apertures of the first and second components elastically deform to an elastically averaged final configuration that aligns the first and second components in four planar orthogonal directions.

11. The elastically averaged alignment system of claim 10, wherein:
the first component comprises sheet metal;
the second component comprises a compressible material; and
the elastically deformable alignment fastener interferingly, deformably, and matingly engages with the first component to fasten the second component to the first component between the flange and the one or more retention features.

12. The elastically averaged alignment system of claim 11, wherein:
the first component comprises a door assembly of a vehicle; and
the second component comprises sound absorbing material.

13. The elastically averaged alignment system of claim 9, further comprising:
at least a third component disposed between the first and second components, the third component comprising a third aperture configured and disposed to align with the first and second apertures when the first, second and at least the third components are assembled together.

14. The elastically averaged alignment system of claim 9, wherein:
the first component comprises a plurality of the first aperture;
the second component comprises a plurality of the second aperture, each being configured and disposed to align with a respective one of the plurality of the first aperture when the first and second components are assembled together; and further comprising:
a plurality of the elastically deformable alignment fastener disposed within respective pairs of the first and second apertures.

15. The elastically averaged alignment system of claim 9, wherein:
the elastically deformable alignment fastener interferingly, deformably, and matingly engages with the first component to fasten the second component to the first component between the flange and the one or more retention features.

16. The elastically averaged alignment system of claim 15, wherein:
the first aperture has a first diameter; and
the second aperture has a second diameter that is greater than the first diameter.

17. The elastically averaged alignment system of claim 9, wherein:
the object is a unitary object having the head portion and the body portion integrally formed.

* * * * *